M. BOYER.
WHEEL STRUCTURE.
APPLICATION FILED SEPT. 24, 1917.

1,256,653.

Patented Feb. 19, 1918.

Inventor
MARTIN BOYER
By Watson E. Coleman
Attorney

UNITED STATES PATENT OFFICE.

MARTIN BOYER, OF LOWRY, MINNESOTA.

WHEEL STRUCTURE.

1,256,653.

Specification of Letters Patent. Patented Feb. 19, 1918.

Application filed September 24, 1917. Serial No. 193,002.

*To all whom it may concern:*

Be it known that I, MARTIN BOYER, a citizen of the United States, residing at Lowry, in the county of Pope and State of Minnesota, have invented certain new and useful Improvements in Wheel Structures, of which the following is a specification, reference being had to the accompanying drawings.

This invention relates to certain improvements in wheel structures and it is an object of the invention to provide a device of this general character having novel and improved means whereby the shocks and jars incident to travel are substantially entirely eliminated.

It is also an object of the invention to provide a novel and improved wheel structure including a hub having tubular spokes radiating therefrom together with a rim disposed around the hub and wherein plungers are disposed through the tubular spokes and coact with the cushioning means carried by the hub and with the rim.

The invention also has for an object to provide a novel and improved wheel structure wherein the tire arranged upon the rim of the wheel serves as a cushioning element coacting with radially movable plungers.

It is also an object of the invention to provide a novel and improved wheel structure including radially movable plungers coacting with suitable cushioning elements and wherein cushioning means are arranged directly on the plungers for imparting great resiliency to the structure.

The invention consists in the details of construction and in the combination and arrangements of the several parts of my improved wheel structure wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings wherein.

Figure 1:
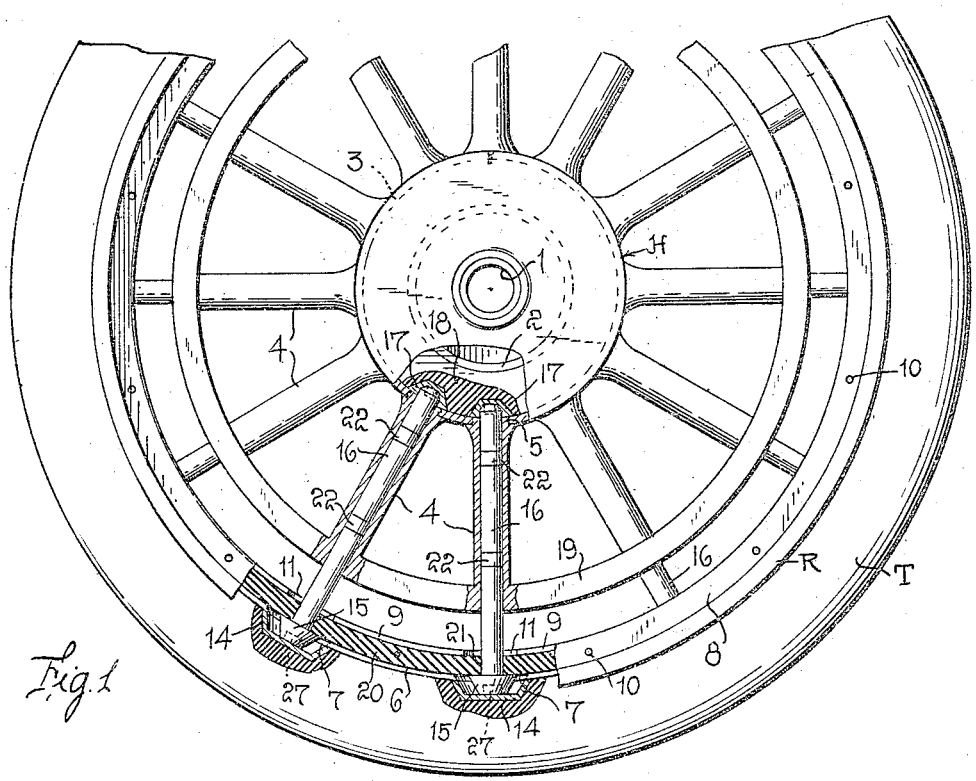
Figure 1 is a fragmentary view partly in elevation and partly in section illustrating a wheel constructed in accordance with an embodiment of my invention.
Figure 2:
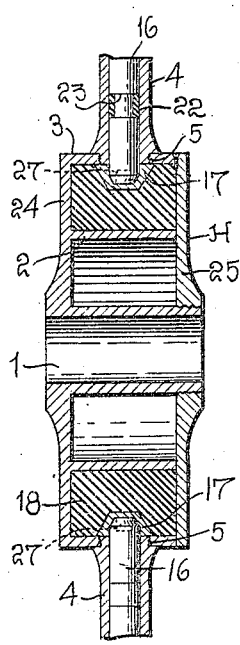
Fig. 2 is a fragmentary sectional view taken through the hub portion of my improved wheel with the inner end portion of the plunger shown in elevation.
Figure 3:
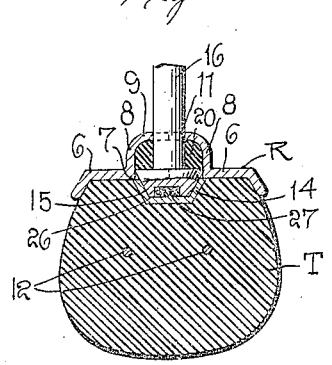
Fig. 3 is a fragmentary sectional view taken through the tire and rim of my improved structure with the co-acting end portion of a plunger shown in elevation.

As disclosed in the accompanying drawings H denotes a hub embodying the sleeve or barrel 1 adapted to be mounted directly upon a supporting axle and disposed around said barrel or sleeve 1 in spaced relation are the annular members 2 and 3 concentric to each other and to the sleeve or barrel 1.

Radiating from the outer annular member 3 of the hub H are the tubular spokes 4, with the bores thereof in communication with the space between the annular members 2 and 3 through the medium of the openings 5 produced in the annular member 3.

R denotes a rim disposed around the hub H and substantially concentric thereto when the wheel is free of load and said rim at substantially its transverse center is divided circumferentially into two sections 6. When in assembled relation the inner marginal portions have produced therein a series of circumferentially spaced elongated slots 7 having their major axes extending circumferentially of the rim. The inner marginal portions of the sections 6 of the rim are also provided with circumferentially disposed and inwardly directed flanges 8 having their free marginal portions inturned as at 9 for contact one with the other and in order to afford an annular chamber for a purpose to be hereinafter more particularly referred to. Co-acting with the flanges 8 and disposed through the chamber afforded thereby are the rivets 10 or other fastening means which serve to maintain the sections 6 of the rim R in assembled relation. The inturned portions 9 of the flanges are provided with registering recesses 11 to afford elongated openings extending in the same general direction as the openings 7 and in radial alinement therewith.

Mounted upon the rim R is the tire T of a cushion type and preferably of solid rubber.

Embedded within the tire T are the reinforcing members or wires 12 disposed circumferentially of the tire and in predetermined spaced relation. These reinforcing members or wires 12 serve to facilitate the maintenance of the tire T in applied position upon the rim R.

The inner face of the tire T has embedded therein a plurality of metallic sockets 14 each adapted to register with a slot 7 in the rim R. Seated within each of the sockets 14 is a head 15 arranged at the outer end of a plunger 16. This plunger is also directed through an opening or slot afforded by the registering recesses 11 and loosely extends within a tubular spoke 4. The inner end portion of the plunger 9 extends within a socket 17 embedded in the outer face of a cushioning element 18 snugly fitting within the space afforded between the annular members 2 and 3.

The outer end portions of the tubular spokes 4 terminate a predetermined distance inwardly of the rim R, and said outer end portions are connected by the annular member 19 concentric to the hub H. The annular member 19 may be formed in any desired manner and fixed to the outer end portions of the spokes 4 as desired but preferably by welding so that said annular member 19 and spokes 4 will be substantially integral.

Snugly fitting within the annular chamber afforded by the flanges 8 is a compression member 20 preferably of rubber and which is provided with suitable openings 21 through which the plungers 16 snugly pass so that said member 20 serves as a cushion to compensate for the circumferential movement of the plungers 16 relative to the rim R and also to normally maintain said plunger 16 at substantially the longitudinal center of the openings 7 and the openings afforded by the recesses 11.

It has also been found in practice of advantage to provide a portion of each of the plungers 16 within a spoke 4 with a pair of radially spaced gaskets 22 preferably of rubber and to seat each of said gaskets 22 within an annular groove 23 suitably positioned in the periphery of the plunger 16.

The sleeve 1 and the annular members 2 and 3 are maintained in fixed relative position through the medium of a plate 24 preferably integrally formed with corresponding ends thereof. Co-acting with the opposite end portions of the sleeve 1 and members 2 and 3 is the removable plate 25 secured thereto in any manner which will best meet the requirements of practice.

I also find it of advantage to provide the opposite end faces of each of the plungers 16 with a recess or pocket 26 and snugly fitting within each of said pockets is a plug 27 preferably of compressed paper and which plug serves to substantially eliminate the possibility of noise incident to the operation of the plunger. In practice it is preferred to provide the outer or working face of the plug 27 with a coating of dry graphite or the like.

From the foregoing description it is thought to be obvious that a wheel structure constructed in accordance with my invention is particularly well adapted for use by reason of the convenience and facility with which it may be assembled and operated and it will also be obvious that my invention is susceptible of some change and modification without materially departing from the principle and spirit thereof and for this reason I do not wish to be understood as limiting myself to the precise arrangement and formation of the several parts herein shown in carrying out my invention in practice except as hereinafter claimed.

I claim:

1. A wheel structure including a hub, tubular spokes radiating therefrom, a rim surrounding the hub and provided with circumferentially spaced openings, a cushion tire mounted upon the rim, sockets embedded within the inner face of the tire and in registry with the openings of the rim, plungers loosely mounted within the spokes extending through the openings in the rim and seated within the sockets of the tire, and cushioning means co-acting with the inner end portions of the plungers.

2. A wheel structure including a hub, tubular spokes radiating therefrom, a rim surrounding the hub and provided with circumferentially spaced openings, a cushion tire mounted upon the rim, sockets embedded within the inner face of the tire and in registry with the openings of the rim, plungers loosely mounted within the spokes and extending through the openings in the rim and seated within the sockets of the tire, and cushioning means coacting with the inner end portions of the plungers, the portions of the plungers within the sockets being provided with heads.

3. A wheel structure including a hub, tubular spokes radiating therefrom, a rim surrounding the hub and provided with circumferentially spaced openings, circumferentially disposed and inwardly directed flanges carried by the rim, a cushion tire mounted upon the rim, sockets embedded within the inner face of the tire and in registry with the openings of the rim, plungers loosely mounted within the spokes extending between the flanges of the rim and through the openings of the rim and seated within the sockets of the tire, cushioning means coacting with the inner end portions of the plungers, and a compression member fitted between the annular flanges of the rim and through which the plungers snugly pass, said compression member serving as a cushion to compensate for the circumferential movement of the plungers relative to the rim.

4. A wheel structure including a hub, tubular spokes radiating therefrom, a rim surrounding the hub and provided with circumferentially spaced openings, circumferentially disposed and inwardly directed flanges carried by the rim, a cushion tire mounted upon the rim, sockets embedded within the inner face of the tire and in registry with the openings of the rim, plungers loosely mounted within the spokes extending between the flanges of the rim and through the openings of the rim and seated within the sockets of the tire, cushioning means co-acting with the inner end portions of the plungers, and a compression member fitted between the annular flanges of the rim and through which the plungers snugly pass, said compression member serving as a cushion to compensate for the circumferential movement of the plungers relative to the rim, the free marginal portions of the flanges of the rim being inwardly inturned for contact one with the other, said inturned portions being provided with registering recesses to afford elongated openings through which the plungers are disposed.

5. A wheel structure including a hub, tubular spokes radiating therefrom, a rim surrounding the hub and provided with circumferentially spaced openings, a cushion tire mounted upon the rim, sockets embedded within the inner face of the tire and in registry with the openings of the rim, plungers loosely mounted within the spokes, extending through the openings in the rim, and seated within the sockets of the tire, cushioning means co-acting with the inner end portions of the plungers, and compression means carried by the rim and coacting with the outer end portions of the plungers independently of the tire to serve as a cushion to compensate for the circumferential movement of the plungers relative to the rim.

In testimony whereof I hereunto affix my signature in the presence of two witnesses.

MARTIN BOYER.

Witnesses:
I. W. ENGEBUTSON,
WM. ALLEN.

Copies of this patent may be obtained for five cents each, by addressing the "Commissioner of Patents, Washington, D. C."